G. E. CLOW.
Scythe-Snath Fastening.
No. 207,164. Patented Aug. 20, 1878.
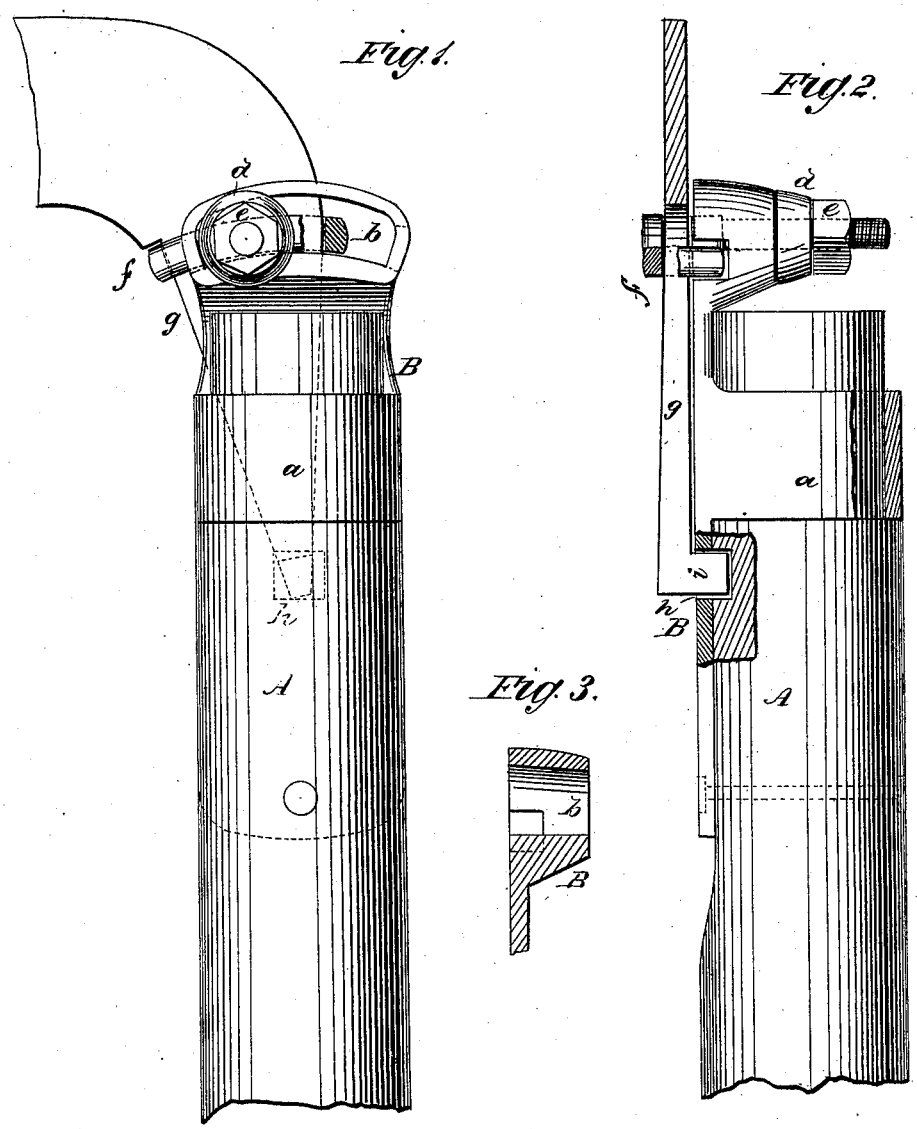
WITNESSES:
Francis McArdle.
C. Sedgwick
INVENTOR:
G. E. Clow
BY Munn & Co
ATTORNEYS.

UNITED STATES PATENT OFFICE.

GEORGE E. CLOW, OF SEYMOUR, INDIANA.

IMPROVEMENT IN SCYTHE-SNATH FASTENINGS.

Specification forming part of Letters Patent No. 207,164, dated August 20, 1878; application filed February 4, 1878.

*To all whom it may concern:*

Be it known that I, GEORGE E. CLOW, of Seymour, in the county of Jackson and State of Indiana, have invented a new and Improved Snath-Fastening, of which the following is a specification:

Figure 1 is a side elevation of a portion of a snath having my improved fastening attached. Fig. 2 is a front elevation, partly in section. Fig. 3 is a detail sectional view of a portion of the fastening.

Similar letters of reference indicate corresponding parts.

The invention will first be described in connection with the drawing, and then pointed out in the claim.

In the drawing, A is an ordinary scythe-snath, and B is a plate, having a loop, $a$, for receiving the end of the snath. The outer end of the plate B projects beyond the end of the snath and is thickened, and in the thickened portion there is an arc-shaped slot, $b$, for receiving the loop-bolt $c$, the shank of which extends through the slot $b$, and is provided with a washer, $d$, and nut $e$. The loop $f$ is of suitable size and form to receive the scythe-shank $g$, and the metal at the ends of the arc-shaped slot $b$ is cut away to allow the loop to project beyond the edges of the plate B. An aperture, $h$, is formed in the plate B for receiving the nib $i$ on the end of the shank. The shank swings on the nib, and is clamped in any desired position by turning the nut $e$.

By means of this device the scythe may be quickly adjusted in any desired position.

I am aware that it is not new to fasten a scythe to a snath by a cap and adjustable loop, but my ring or band stops and leaves a solid neck with enlarged head for the guide. Hence,

What I claim is—

A snath-ferrule formed with solid neck-extension and enlarged head slotted to receive and adjust the clamping-loop, as shown and described.

GEORGE E. CLOW.

Witnesses:
 ELI B. CARESS,
 JOHN HEITMAN.